(12) United States Patent
Craig et al.

(10) Patent No.: US 6,837,318 B1
(45) Date of Patent: Jan. 4, 2005

(54) RESCUE AND EXPLORATION APPARATUS

(76) Inventors: Hanna Craig, 4962 Castle Ct., Anchorage, AK (US) 99508; Heather Craig, 4962 Castle Ct., Anchorage, AK (US) 99508

( * ) Notice: Subject to any disclaimer, the term of this patent is extended or adjusted under 35 U.S.C. 154(b) by 0 days.

(21) Appl. No.: 10/402,561

(22) Filed: Mar. 28, 2003

Related U.S. Application Data

(60) Provisional application No. 60/386,132, filed on Jun. 5, 2002.

(51) Int. Cl.[7] .............................................. B62D 11/99
(52) U.S. Cl. ........................ 180/6.7; 130/9.1; 130/14.1
(58) Field of Search ........................... 180/6.7, 9, 9.1, 180/14.1–14.4, 204, 418; 280/411.1, 419; 305/100, 107, 199

(56) References Cited

U.S. PATENT DOCUMENTS

| | | | | |
|---|---|---|---|---|
| 3,623,780 A | * | 11/1971 | Kell .......................... 305/181 |
| 3,715,146 A | * | 2/1973 | Robertson ................... 305/181 |
| 3,912,336 A | * | 10/1975 | Ritter et al. ................ 305/100 |
| 4,067,448 A | * | 1/1978 | Bergeron, Jr. ................ 414/12 |
| 4,119,166 A | * | 10/1978 | Ayotte et al. .............. 180/14.1 |
| 4,152,589 A | * | 5/1979 | Mitchell ................ 250/231.16 |
| 4,223,908 A | * | 9/1980 | Poliker et al. .............. 280/419 |
| 4,252,495 A | * | 2/1981 | Cook ......................... 414/608 |
| 4,279,449 A | * | 7/1981 | Martin et al. ............... 305/178 |
| 4,382,607 A | * | 5/1983 | Voight ....................... 280/408 |
| 4,727,949 A | * | 3/1988 | Rea et al. .................. 180/9.32 |
| 4,878,451 A | * | 11/1989 | Siren ...................... 440/12.66 |
| 4,909,341 A | * | 3/1990 | Rippingale et al. .......... 180/9.1 |
| 5,153,437 A | * | 10/1992 | Nishii et al. ........... 250/231.14 |
| 5,174,405 A | * | 12/1992 | Carra et al. ............... 180/9.32 |
| 5,332,052 A | * | 7/1994 | Carnevale ................... 180/14.2 |
| 5,427,557 A | * | 6/1995 | Lunden, Sr. ................. 441/82 |
| 6,170,848 B1 | * | 1/2001 | Wechner .................. 280/411.1 |
| 6,523,629 B1 | * | 2/2003 | Buttz et al. ................. 180/167 |

* cited by examiner

*Primary Examiner*—Lesley D. Morris
*Assistant Examiner*—L Lum
(74) *Attorney, Agent, or Firm*—Michael J. Tavella

(57) ABSTRACT

A rescue and exploration apparatus that has a first continuous track rotatably supported within a first frame and a second continuous track rotatably supported within a second frame. The first and second continuous tracks are driven by at least one drive motor. The first and second frames are pivotally connected about a pivot point. A steering mechanism articulates the first and second frames about the pivot point. A remote control is operatively connected to the rescue and exploration apparatus, and a power source is electronically connected to the remote control the drive motors, and the steering mechanism. A tether may be used for rescue type uses by pulling the rescue and exploration apparatus back to safety with a rescue victim. A joystick and microcontroller on the remote control controls the speed and direction of the drive motors and steering mechanism.

44 Claims, 7 Drawing Sheets

RESCUE AND EXPLORATION APPARATUS

This application claims priority based on U.S. Provisional Patent Application Ser. No. 60/386,132, entitled "Ice Crawler Apparatus," and filed Jun 5, 2002.

DETAILED DESCRIPTION OF EMBODIMENTS OF THE INVENTION

The drawings disclose but a few embodiments of the invention. One skilled in the art will recognize that many variations of the embodiments disclosed are possible and that the scope of the patent protection, when issued, should not be limited to the specific embodiments disclosed herein.

Figure 1:
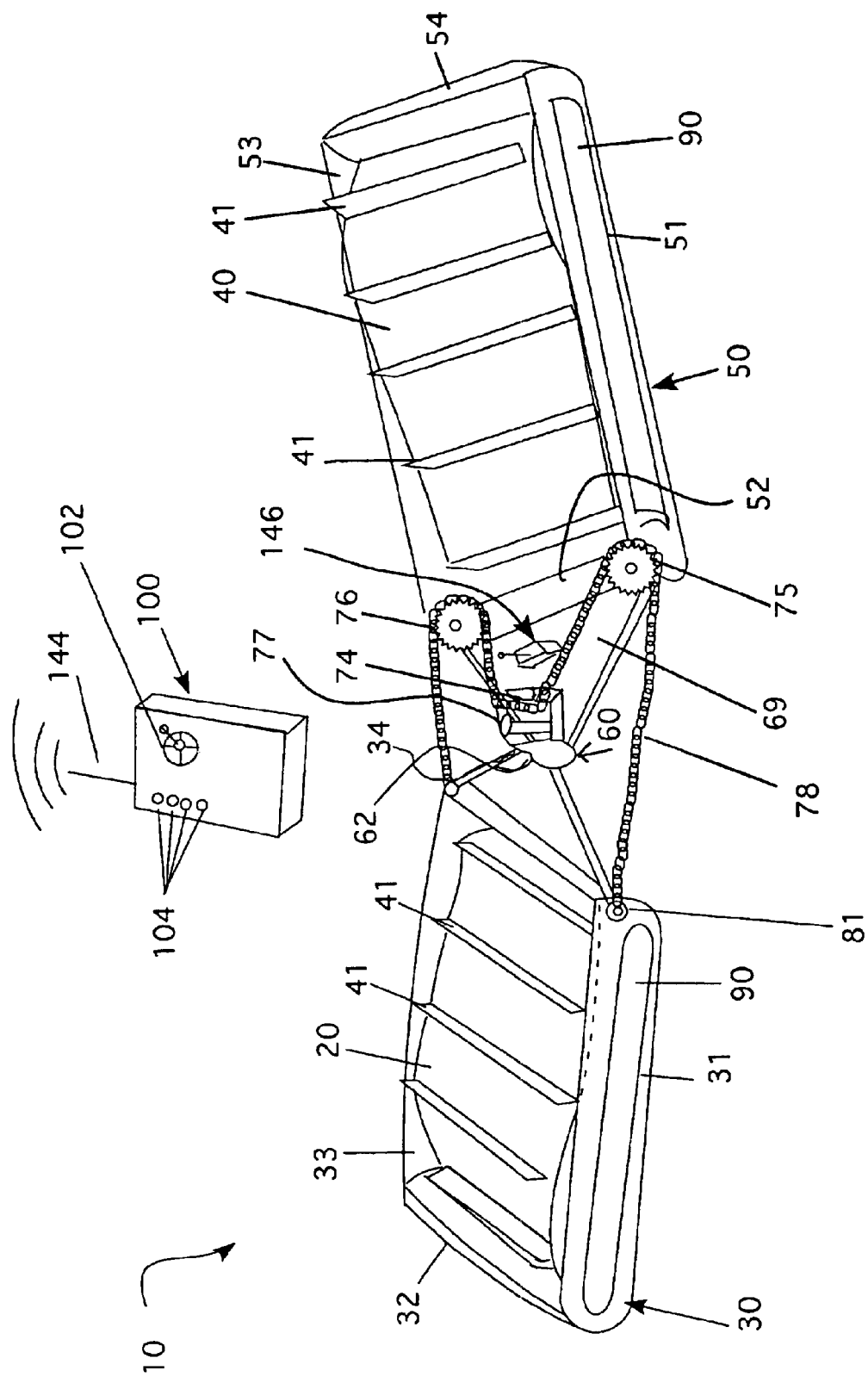
FIG. 1 is a perspective view of an embodiment of a rescue and exploration apparatus according to the present invention.
Figure 2:
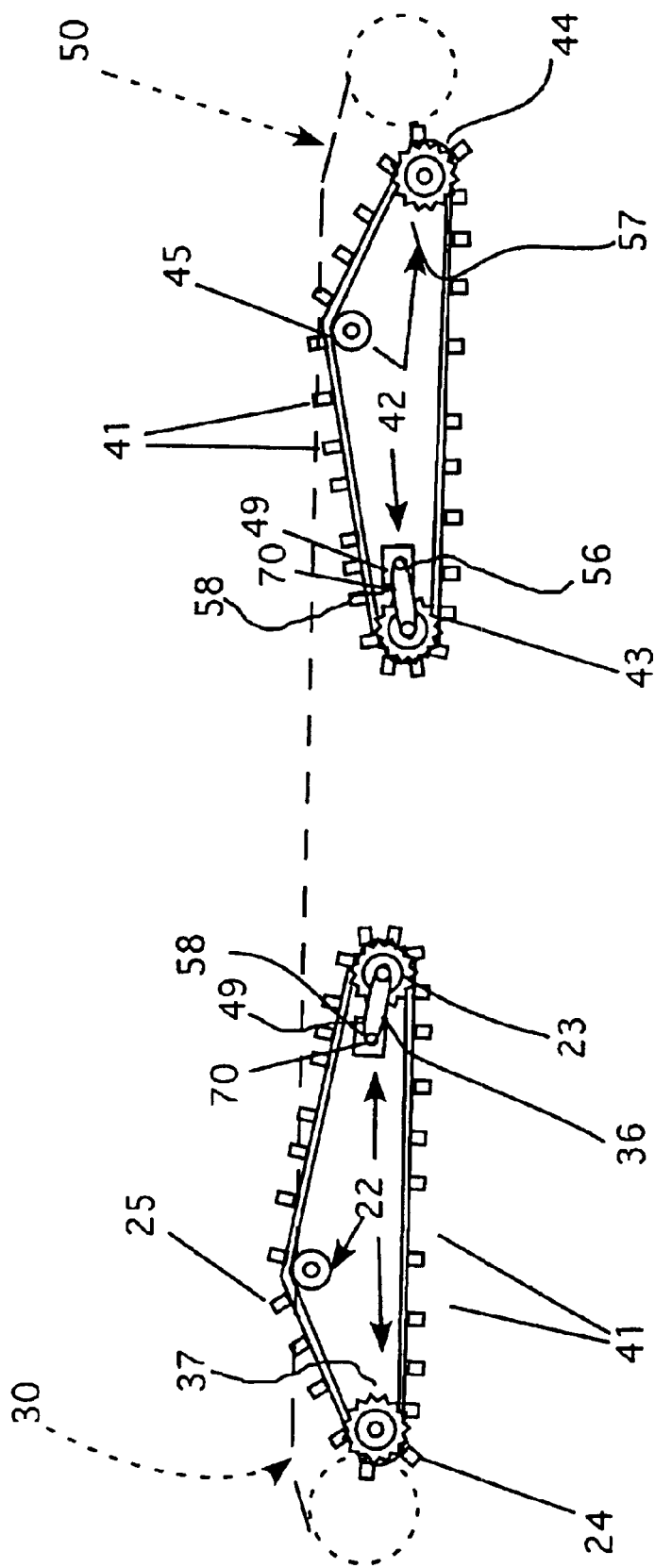
FIG. 2 is a side view of an embodiment of the drive system for the first and second tracks of the rescue and exploration apparatus depicted in FIG. 1.

FIG. 1 is a perspective view of the rescue and exploration apparatus 10. The rescue and exploration apparatus 10 has a first frame 30 and a second frame 50. The first frame 30 comprises a left side 31, a front side 32, a right side 33 substantially parallel to the left side 31, and a rear side 34 substantially parallel to the front side 32. In one embodiment, the four sides form a substantially rectangular first frame 30. The rescue and exploration apparatus 10 comprises a first continuous track 20 rotatably supported within the first frame 30. In one embodiment, a first plurality of rollers 22 are rotatably mounted to the first frame 30 between the left side 31 and right side 33. In other embodiments, the first plurality of rollers 22 comprises a first roller 23 and a second roller 24. In yet other embodiments, the first plurality of rollers 22 further comprises a third roller 25, as shown in FIG. 2.

The second frame 50 comprises a left side 51, a front side 52, a right side 53 substantially parallel to the left side 51, and a rear side 54 substantially parallel to the front side 52. In one embodiment, the four sides form a substantially rectangular second frame 50. The rescue and exploration apparatus 10 comprises a second continuous track 40 rotatably supported within the second frame 50. In one embodiment, a second plurality of rollers 42 are rotatably mounted to the second frame 50 between the left side 51 and right side 53. In other embodiments, the second plurality of rollers 42 comprises a first roller 43 and a second roller 44. In yet other embodiments, the second plurality of rollers 42 further comprises a third roller 45. It should be apparent from FIG. 2 that the first continuous track 20 and the second continuous track 50 have similar designs and construction but are arranged in opposite directions away from the pivot point 60.

The rescue and exploration apparatus 10 has a pivot point 60, about which the first frame 30 and second frame 50 are pivotally connected. In one embodiment, the pivot point 60 is configured to allow the first and second frames 30, 50 to articulate horizontally and vertically in relation to each other. In other embodiments, the pivot point 60 comprises a ball pivot mechanism 62 connected to the rear side 34 and the front side 52. In yet other embodiments, the ball pivot mechanism 62 is secured to the distal ends 64, 66 of first and second connector pieces 68, 69 extending from the rear side 34 and front side 52, respectively.

A first drive motor 70 is secured about the first frame 30 and is drivably connected to one of the rollers in the first plurality of rollers 22. In one embodiment, drive motor 70 is mounted to the rear side 34 about the first connector piece 68. A second drive motor 72 is secured about the second frame 50 and is drivably connected to one of the rollers in the second plurality of rollers 42. In one embodiment, the second drive motor 72 is mounted to the front side 52 about the second connector piece 69. Steering means 73 is mounted about the pivot point 60. In one embodiment, steering means 73 comprises a steering motor 74 operatively connecting the first frame 30 to the second frame 50. In other embodiments, steering means 73 comprises an actuator (not shown).

FIG. 2 shows the drive mechanism of one embodiment of the invention. A first continuous track 20 is supported by the first plurality 22 of rollers 23, 24, 25. In one embodiment, each of the rollers 23, 24, 25 has two distal ends 26, 27 secured in spaced relation within the first frame 30 between left side 31 and right side 33. At least one of the first plurality 22 of rollers 23, 24, 25 is drivably connected to the first drive motor 70. In one embodiment, a sprocket 36 frictionally engages the track 20 at one of the rollers 23, 24, 25 so to prevent the continuous track 20 from moving off center during use. In other embodiments, a second sprocket 37 frictionally engages the track 20 at another of the rollers 23, 24, 25.

In one embodiment, the first continuous track 20 and the second continuous track 40 are made of a thin, sturdy, flexible material. In other embodiments, the material comprises silicone-reinforced rubber. In yet other embodiments, the first continuous track 20 and the second continuous track 40 are adapted to withstand extreme temperature variations, including freezing conditions.

In one embodiment, the first continuous track 20 and the second continuous track 40 each have a contact surface about eight inches wide and about twenty inches long. In other embodiments, the first and second continuous tracks 20, 40 include a series of rigid transverse strips 41 on the outer surfaces of the tracks, configured to improve traction. In yet other embodiments, the tracks 20, 40 include a plurality of paddles 48 on the outer surfaces, configured to propel or otherwise transport the apparatus 10 across water. In yet other embodiments, the strips 41 or paddles 48 are manufactured of aluminum. One of average skill in this art may adapt the first continuous track 20 and the second continuous track 40 to be of different sizes, without departing from the scope of this disclosure or the accompanying claims.

Similar to the first continuous track 20, the second continuous track 40 is supported by the second plurality 42 of rollers 43, 44, 45. In one embodiment, each of the rollers 43, 44, 45 has two distal ends 46, 47 secured in spaced relation within the second frame 50 between left side 51 and right side 53. At least one of the rollers 43, 44, 45 is drivably connected to the second drive motor 72. In one embodiment, a sprocket 56 frictionally engages the track 40 at one of the rollers, 43, 44, 45 so to prevent the track 40 from moving off center during use. In other embodiments, a second sprocket 57 frictionally engages the track 40 at another of the rollers, 43, 44, 45.

In one embodiment, the sides 31–34, 51–54 of first and second frames 30, 50 are manufactured of steel conduit. In other embodiments, the steel conduit is about ¾ inch O.D. In yet other embodiments, the steel conduit sides 31–34, 51–54 forming the first and second frames 30, 50 are welded together. In yet other embodiments, the sides 31–34, 51–54 of the first and second frames 30, 50 are connected together respectively by other fastening means known in the relevant art, including without limitation, screws, rivets, adhesive, bolts, or any combination or equivalent thereof. In yet other embodiments, the sides 31–34, 51–54 are manufactured of rigid plastic or aluminum. Other dimensions, materials and manufacturing techniques may be used without departing from the scope of this invention or the following claims.

Figure 3:
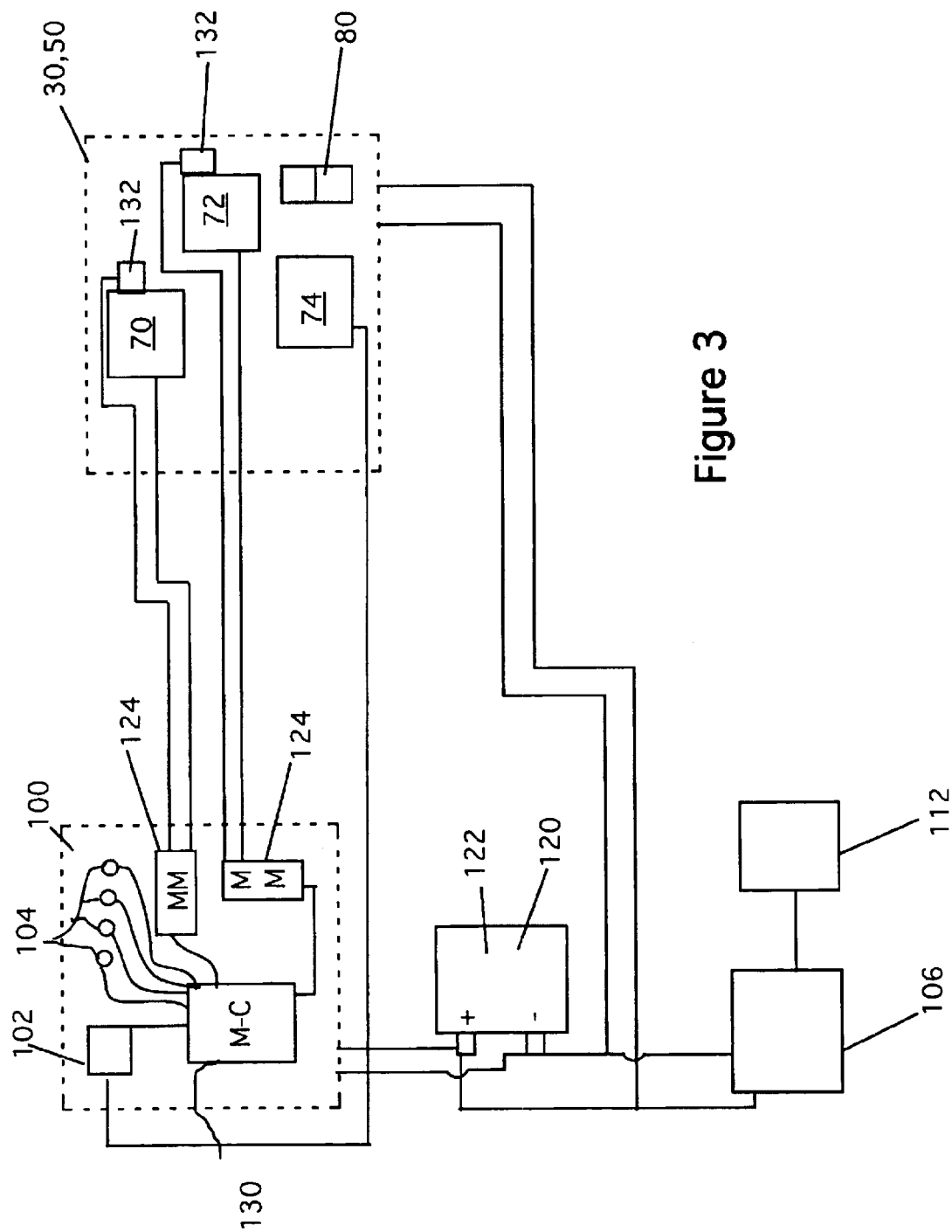
FIG. 3 is a schematic diagram of an embodiment of the connection of electronic components used to control the rescue and exploration apparatus depicted in FIG. 1.

Referring now to FIG. 3, several electronic components may be utilized for controlling the apparatus 10 as desired. A power source 122 may be operatively connected to a remote control 100. In one embodiment, the power source 122 comprises a 12-volt battery 120. In other embodiments, the power source comprises an outlet source of electricity supplied by a plug-in cord, a portable generator, solar cells, combustion engines, fuel cells, steam generators, or any combination thereof (none shown). In yet other embodiments, at least one power source 122 is mounted on the apparatus 10 and operatively connected to the drive motors 70, 72 and the steering motor 74. In yet other embodiments, the power source 122 connected to the remote control 100 is also operatively connected to the drive motors 70, 72 and the steering motor 74.

The remote control 100 is configured for controlling the speed and direction of the apparatus 10 during use. In one embodiment, the remote control 100 comprises a joystick 102 and a plurality of toggle switches 104 operatively connected to the motors 70, 72, 74. In other embodiments, at least one switch 104 is provided for turning the apparatus 10 on and off. In yet other embodiments, at least one switch 104 is provided for over-riding any programmed controllers that may be included in the remote control 100, such as a speed control.

In one embodiment, the remote control 100 comprises a joystick 102 electronically connected to a micro-controller 130. In other embodiments, the micro-controller 130 comprises a Basic Stamp® micro-controller.

A micro-controller 130 may be operatively connected to at least one motor mind 124 for each motor 70, 72, 74. The micro-controller 130, in one embodiment, is programmed as desired for the operation of the apparatus 10. In other embodiments, the micro-controller 130 is programmed by downloading a program from a computer to the micro-controller 130. In yet other embodiments, the program is written using PBASIC programming code. In other embodiments, the program is de-bugged after it is installed or downloaded to the micro-controller 130. In yet other embodiments, the micro-controller 130 uses substantially the program code provided in the following example:

EXAMPLE

PBASIC Program:

```
Result        var word
Motorpwm      var byte
CDir          var bit
FM            con 1
Output    0
Input     1
Output    2
Output    3
Output    4
Input     5
Output    6
Output    7
Output    8
Output    9
Output   10
Output   11
Output   12
Output   13
Output   14
Output   15
CDir = in5
Read-Joystick:                            'reads joystick
high 0
pause 1                                   'capacitor charges to +5v
RCTIME 0,1,result                         'time is measured from 5-1.5v
motorpwm = result – 500
debug dec motorpwm, tab                   'for debugging purposes
debug de CDir, cr
ifCDir=in5 then No__Change                'checks direction switch
low 4                                     'yes, activates brakes
pause 20                                  '20 millisecond delay
serout FM,396,[$55,$01]                   'reverse direction
high 4                                    'deactivate brakes
No__Change:
Serout FM,396,[$55,$03,motorpwm]          'sets motor speed (PWM)
CDir=in5                                  'reads direction switch
goto Read__Joystick
End:
```

Figure 7:
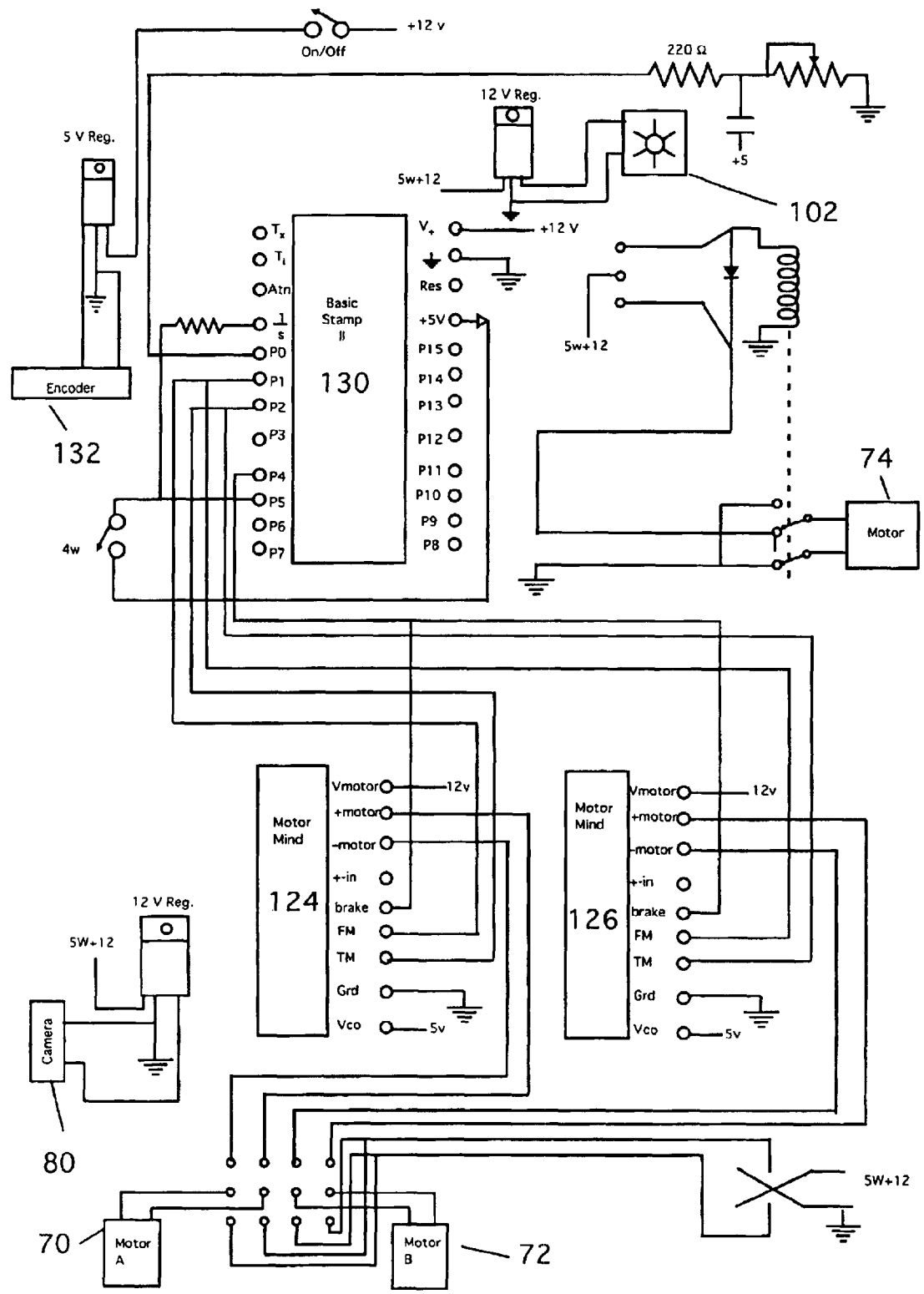
FIG. 7 is a detailed schematic diagram of an embodiment of the electrical circuit connecting the electronic components of one embodiment of the present invention.

All variables are initially defined as either words, bytes, or bits (depending on size). The program code has three defined variables: result, motorpwm, and Cdir. FM is assigned to pin 1 on the micro-controller 130. "Con" stands for connect. On an electronics schematic, such as in FIG. 7, FM on each motor mind 124 connects to pin 1 on the micro-controller 130. All input/output pins on the micro-controller 130 are specified as either input or output pins. The default position of the pin is input. If a pin is not in use, it is specified as output to conserve energy. In this example, the apparatus 10 utilizes pins 0, 1, 2, 4 and 5. Pin 0 is an output pin for speed control, pin 1 is an input pin from the motor minds 124, pin 2 is an output pin to the motor minds 124, pin 4 is an output pin for the brakes on the motor minds 124, and pin 5 is an input pin for forward/reverse. Pin 3 connects to the brake pin on the motor minds 124. "Cdir" stands for caller direction, which is set to input from pin 5.

The main code consists of two labels. "Read_joystick:" is the first label, which determines drive motor speed. "High 0" gives +5 volts to pin 0 (which connects to the potentiometer). "Pause 1" causes the program to pause for 1 millisecond while the capacitor is charging. Next, the "RCtime" (resistor capacitor time) command measures the time for the voltage to drop from +5 to +1.5, is measured and 500 is subtracted from this result, changing the value from a word to a byte. After the program has been installed from the computer to the micro-controller 130, the program is de-bugged. The results from motorpwm and Cdir are shown on the computer screen during this procedure. "Dec" stands for decimal. To easily view the results on the screen, they should be in base 10 (decimal) rather than the default hexadecimal. "Tab" adds a space between the motorpwm values and the Cdir values appearing on the screen. "CR" stands for carriage return.

Next, the program checks the forward/reverse switch to determine which direction to move. If the switch has not been triggered, the program is told to go back to the "No_change:" label. Otherwise, the brakes are activated for 20 milliseconds, the direction is switched, and the brakes are subsequently deactivated.

"No_change:" is the next label that the program refers to if the direction switch has not been triggered. This label sets the motor speed according to the joystick. The direction switch is read again, followed by a 500 millisecond delay. The program now returns to the first label, "Read_joystick:"

The micro-controller 130 controls the speed and direction of the motors 70, 72 in conjunction with the motor minds 124. The motor controller 130 delivers operative instructions to each motor mind 124 as directed by a user with the remote control 100. The motor minds 124 in turn deliver speed and direction control signals to the motors 70, 72, 74. In one embodiment, the motor minds 124 use Pulse Width Modulation to control motor speed. In other embodiments, each motor 70, 72 is provided with an encoder 132 for providing operative feedback from each motor to the motor mind 124 and to the micro-controller 130 for interpretation and adjustment according to the program parameters.

Figure 4:
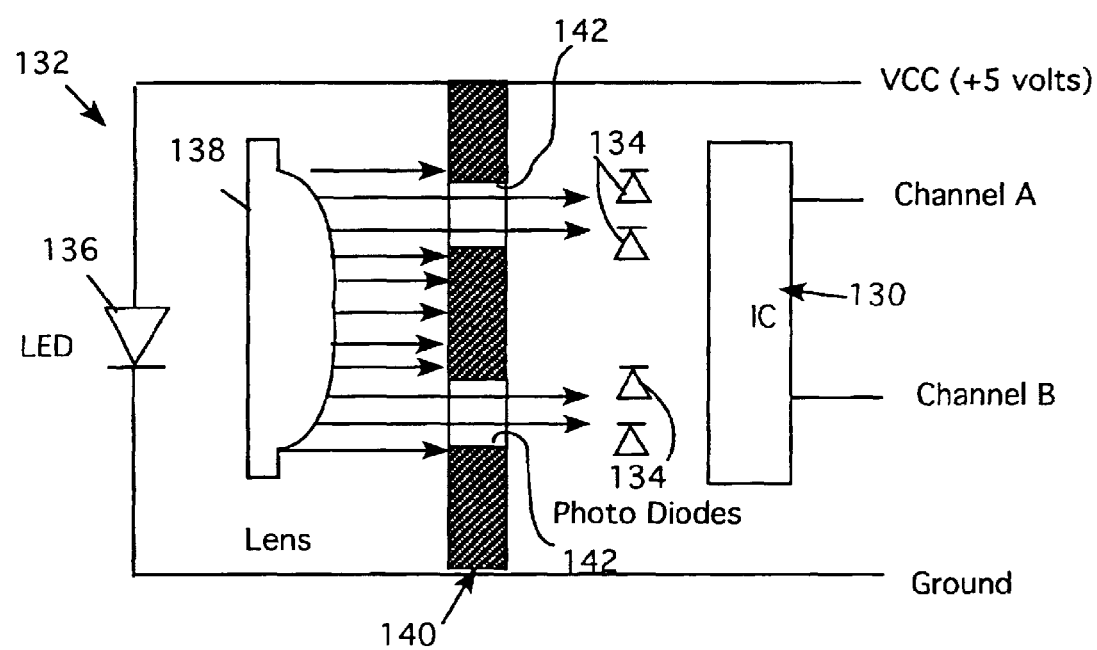
FIG. 4 is a schematic diagram of an embodiment of an optical incremental encoder used to control the speed of drive motors.
Figure 5:
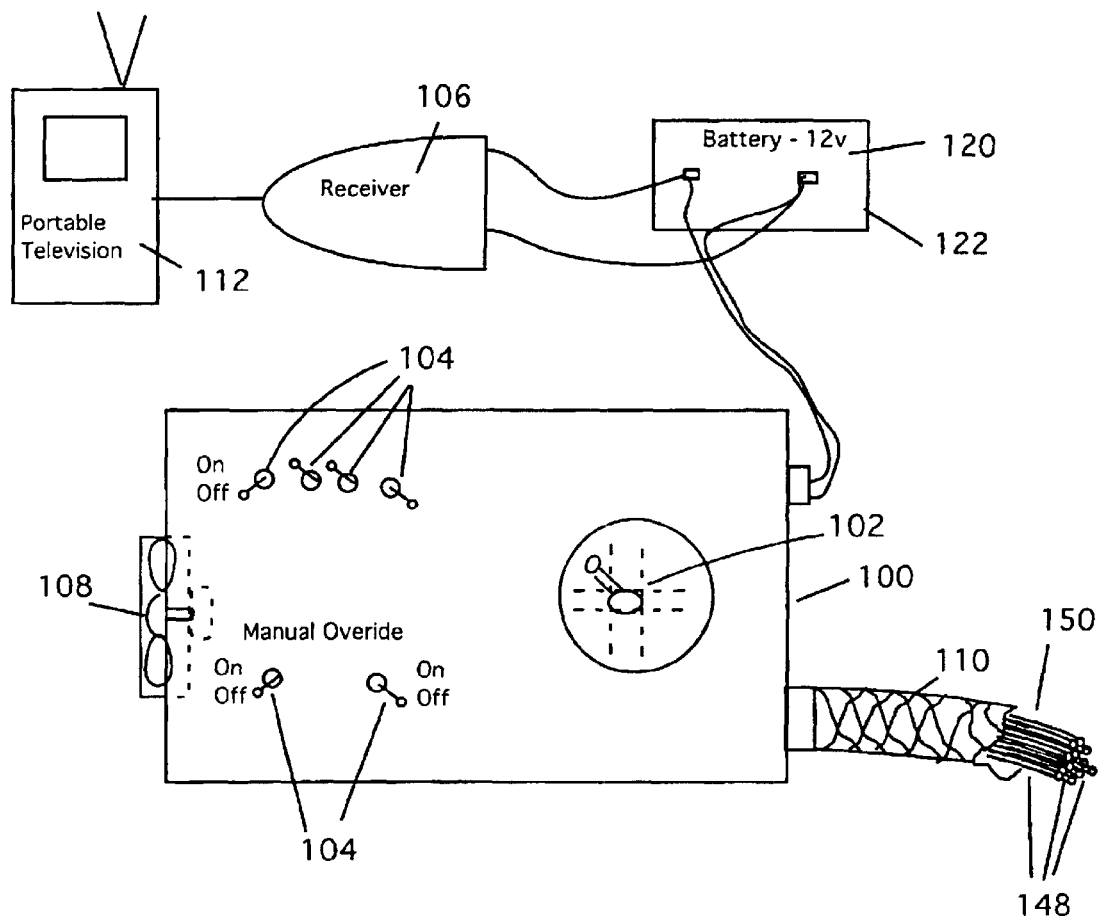
FIG. 5 illustrates an embodiment of the remote control used to operate the rescue and exploration apparatus.

In one embodiment, one encoder 132 is electronically connected to each motor 70, 72. In other embodiments, an encoder 132 comprises an optical incremental encoder module, as shown in FIG. 4. In yet other embodiments, each encoder 132 comprises a light source 136, such as an LED, a lens 138, such as a polycarbonate lens, a code wheel 140 having a plurality of slits 142, and a plurality of photo diodes 134. For each motor 70, 72, 74, the spinning thereof causes the code wheel 140 to spin. The lens 138 collimates the light emitted from the light source 136 into a parallel beam. The photo diodes 134 detect the light from each slit 142 in the code wheel 140 and send a signal through one or more channels electrically connecting the encoder 132 to a motor mind 124. The motor mind 124 interprets the feedback from the encoder 132 and communicates information to the micro-controller 130 for further interpretation and adjustment according to the parameters of the program installed on the micro-controller 130.

In one embodiment, the micro-controller 130 comprises between 10 and 20 input/output ports, between about 1 and about 5 kilobytes of read-only memory, such as Electronically Erasable and Programmable Read-Only Memory, and a processor having a processing speed between about 10 megahertz and about 1 gigahertz. In other embodiments, the motor minds 124 are operatively connected to a first transmitter/receiver 144 for communicating with a second transmitter/receiver 146 operatively connected to the motors 70, 72, 74. In yet other embodiments, the motor minds 124 and the remote control 100 are operatively connected to the motors 70, 72, 74 by a tether 110. In yet other embodiments, the electronic components are electronically and operatively connected in accordance with the circuit diagram shown in FIG. 7. One of ordinary skill in the art may modify the illustrated circuit diagram without departing from the scope of the present invention or the accompanying claims.

In embodiments comprising a tether 110, a plurality of electronic connections 148, such as wires, cables, and fiber optic cables, are strung through the internal cavity 150 of the tether 110. In one embodiment, the connections 148 are strung into a 16-pin connector (not shown) attached to one end of the tether 110. In other embodiments, the tether 110 externally comprises a braided nylon rope. In embodiments comprising first and second transmitter/receivers 144, 146, the transmitter/receivers communicate with each other by radio or infrared waves.

In one embodiment, the motor minds 124 and micro-controller 130 are adapted to handle large amounts of electronic current and the resultant heat that is generated. In other embodiments, the extra heat is dissipated by one or more heat sinks (not shown) secured to each motor mind 124 and/or micro-controller 130. In yet other embodiments, the extra heat is further dissipated by one or more cooling fans 108 within the remote control 100.

Figure 6:
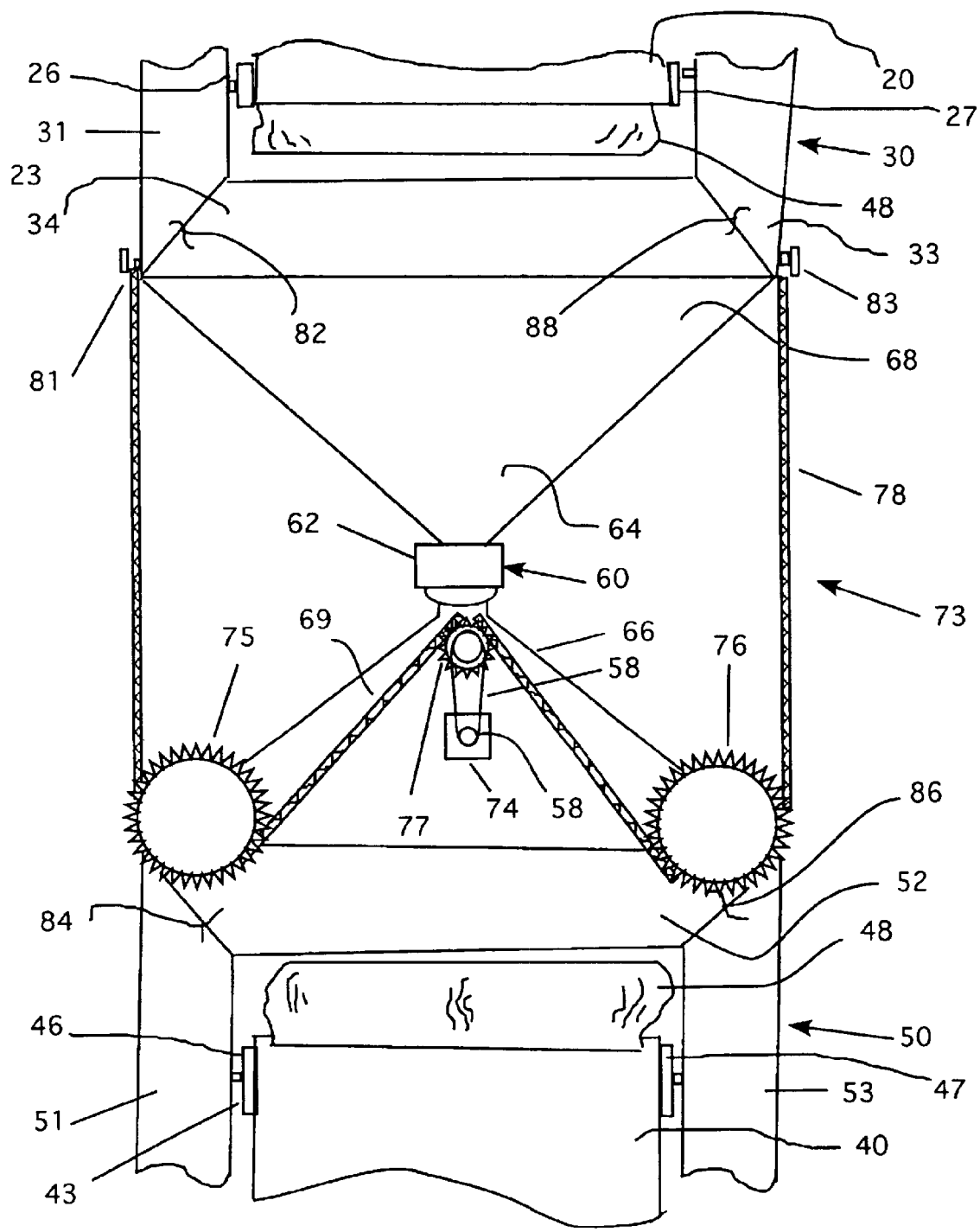
FIG. 6 is a top view of an embodiment of the steering mechanism used to maneuver the first frame in relation to the second frame.

As shown in FIG. 6, in one embodiment, the rear side 34 of the first frame 30 is pivotally connected to the front side 52 of the second frame 50 about pivot point 60, which is configured to allow the first frame 30 to change its horizontal and vertical spatial orientation in relation to the second frame member 50. In other embodiments, the first and second frames 30, 50 are configured so as to fold together about the pivot point 60 for ease of transportation or storage.

Steering means 73 is provided configured to mechanically adjust the horizontal spatial orientation of the frames 30, 50 to each other. In one embodiment, an actuator (now shown) is operatively connected to the pivot point 60 to mechanically articulate the frames 30, 50. In other embodiments, a steering motor 74 drives a central steering sprocket 77 mounted in proximity to pivot point 60 and is drivably connected to the frames 30, 50 by a steering chain 78. In one embodiment, as shown in FIG. 6, a first end 81 of the steering chain 78 is secured about a first corner 82 connecting the left side 31 to the rear side 34. The steering chain 78 extends toward the left side 51 of the second frame member 50 in proximity to which the steering chain 78 drivably engages a left steering sprocket 75 mounted about a second corner 84 connecting the left side 51 to the front side 52. The steering chain 78 extends around sprocket 75 toward the pivot point 60, in proximity to which the steering chain 78 drivably engages the central steering sprocket 77. The steering chain 78 extends around sprocket 77 toward the right side 53 of the second frame 50 and drivably engages the right steering sprocket 76 mounted about a third corner 86 connecting the right side 53 to the front side 52. From the right steering sprocket 76, the steering chain 78 extends forward and is secured at its second end 83 about a fourth corner 88 connecting the right side 33 to the rear side 34.

By driving the central steering sprocket 77 with the steering motor 74 in either a clockwise or counterclockwise direction, the steering chain is translated about sprockets 75, 76 to articulate the first frame 30 in relation to the second frame 50 about the pivot point 60 by either pulling the first end 81 of the chain 78 at the first corner 82 toward sprocket 75 or pulling the second end 83 of the chain 78 at the fourth corner 88 toward sprocket 76.

In one embodiment, the first drive motor 70 is used to drive one or both sprockets 36, 37 connected to the first set of rollers 22, and the second drive motor 72 is used to drive one or both sprockets 56, 57 connected to the second set of rollers 42. In other embodiments, a belt or chain 58 may connect a pulley or drive shaft 49 on each motor 70, 72 to a pulley or drive shaft having respective sprockets 36, 37, 56, 57 mounted thereon. In yet other embodiments, the belt 58 is a ⅕ pitch belt.

Plate covers (not shown) may cover the sprockets 75, 76 to serve as a safety cover. In one embodiment, the plate covers are manufactured of a metallic material having a rubber edging (not shown). In other embodiments, the plate covers are manufactured of plastic or rubber.

In one embodiment, the first and second drive motors 70, 72 are selectively actuated for maneuvering the rescue and exploration apparatus 10. In other embodiments, the rescue and exploration apparatus 10 is configured to move in any radial direction, including forward, reverse, left, and right. In yet other embodiments, the rescue and exploration apparatus 10 is configured to pivot vertically at the pivot point 60 to traverse vertically uneven terrain.

As shown in FIG. 2, a camera 80 may be mounted above or about the pivot point 60 to provide a view of the terrain in front of the rescue and exploration apparatus 10. In one embodiment, the camera 80 is a video camera. In other embodiments, the camera 80 is configured to be swiveled or articulated to view the terrain surrounding the rescue and exploration apparatus 10. In yet other embodiments, the image viewed by the camera 80 is transmitted to a television receiver 106 located on or about the remote controller 100 and displayed on a television 112 electronically connected to the receiver 106. In yet other embodiments, the image is transmitted in real time from the camera 80 to the receiver 106.

Flotation elements. 90 may be secured to one or both of the first and second frame members 30, 50. In one embodiment, the flotation elements 90 are configured to enable the apparatus 10 to float in the event the rescue and exploration apparatus 10 must traverse water. In other embodiments, a life preserver (not shown) is releasably connected to the rescue and exploration apparatus 10. In yet other embodiments, a rescue harness (not shown) is secured to the apparatus 10. In yet other embodiments, a remotely inflatable flotation devise (not shown) is releasably connected to the apparatus 10.

In one embodiment, the apparatus 10 is configured for traversing a variety of terrains, including soft snow, hard snow, ice, snow/ice chunks and a variety of inclines and rocky or sandy terrains. The speed of the apparatus 10 is maintained generally constant by the micro-controller 130. In one embodiment, the speed is between about 3 miles per hour and about 25 miles per hour.

In one embodiment, the apparatus 10 is lightweight to avoid breaking through even thin ice over bodies of water. In other embodiments, the apparatus 10 weighs between about 15 pounds and about 40 pounds. In yet other embodiments, the contact surfaces of each track 20, 40 cover an area sufficient to dissipate the surface pressure of the apparatus 10 setting on ice to between about 3% and about 10% of the pressure that would be applied by the apparatus standing on its end.

In operation, the apparatus 10 can be used to extract a person fallen through ice, locate victims amid debris of a structural calamity, or remotely explore uninhabitable or otherwise impassable territory. With a tether 110, the tether is adapted to allow a user to pull the apparatus 10 from a location where a victim has grabbed hold of a handle (not shown) attached to the apparatus. Using radio or infrared transmission control instead of a tether, the apparatus 10 can travel as remotely far away as the transmission signal and power source constraints permit. In addition to the camera 80, an infrared optical device (not shown) can be mounted to the apparatus 10 to provide night vision capabilities or thermal imagery for detecting body heat of victims hidden from plain view.

In other operations, the apparatus 10 may serve several other purposes, as desired. In one embodiment, the apparatus 10 may be adjusted and outfitted with equipment as desired for scientific research purposes, such as tracking glacial movement or collecting environmental samples under harsh climate conditions. The apparatus 10, in other embodiments, may be adapted to utilize sonar equipment to measure ice thickness or otherwise detect crevices and the depths thereof. It will be obvious to one of ordinary skill in the art to further adapt the apparatus 10 for other uses consistent with the benefits of a remotely controlled robotic apparatus.

While various specific embodiments of the invention have been shown and described for purposes of illustration, the protection afforded by any patent which may issue upon this application is not strictly limited to the disclosed embodiment, but rather extends to all structures and arrangements which fall fairly within the scope of the claims which are appended hereto.

What is claimed is:

1. A rescue and exploration apparatus, comprising:
    (a) at least a first frame and a second frame, the first and second frames being pivotally connected to each other at a pivot point;
    (b) a first continuous track and a second continuous track, the first continuous track being rotatably supported within the first frame and the second continuous track being rotatably supported within the second frame;
    (c) at least a first drive motor mounted to the apparatus, the first drive motor driveably connected to at least one of the first and second continuous tracks;
    (d) a steering means mounted in proximity to the pivot point said steering means having a steering motor driveably connected to a central steering sprocket, the central steering sprocket being mounted in proximity to the pivot point, a first end of a steering chain being secured about a first corner connecting a left side of the first frame to a rear side of the first frame, the steering chain extending toward a left side of the second frame in proximity to which the steering chain driveably engages a left steering sprocket mounted about a second corner connecting the left side of the second frame to a front side of the second frame, the steering chain extending around the left steering sprocket toward the pivot point in proximity to which the steering chain driveably engages the central steering sprocket, the steering chain extending around the central steering sprocket toward a right side of the second frame and driveably engaging a right steering sprocket mounted about a third corner connecting the right side of the second frame to the front side of the second frame, the steering chain extending around the right steering sprocket to a fourth corner connecting a right side of the first frame to the rear side of the first frame, the steering chain having a second end secured about the fourth corner;
    (e) a remote control operatively connected to at least the first drive motor and the steering motor; and (f) at least one power source operatively connected to the remote control, the first drive motor and the steering means.

2. The rescue and exploration apparatus of claim 1, wherein the first and second frames each comprise four sides, the frames each having a substantially rectangular shape.

3. The rescue and exploration apparatus of claim 1, further comprising a first plurality of rollers rotatably mounted within the first frame and a second plurality of rollers rotatably mounted within the second frame, the first and second plurality of rollers rotatably supporting the first and second continuous tracks in relation to the first and second frames, respectively.

4. The rescue and exploration apparatus of claim 3, wherein the first drive motor is driveably connected to at least one of the first plurality of rollers and a second drive motor is mounted to the apparatus and is driveably connected to at least one of the second plurality of rollers, at least one power source being operatively connected to the second drive motor.

5. The rescue and exploration apparatus of claim 4, further comprising a first and a second drive sprocket, the first drive sprocket driveably connected to at least one of the first plurality of rollers and the second drive sprocket driveably connected to at least one of the second plurality of rollers.

6. The rescue and exploration apparatus of claim 3, further comprising a plurality of drive sprockets driveably connected to at least two of the first plurality of rollers and to at least two of the second plurality of rollers.

7. The rescue and exploration apparatus of claim 1, wherein the first and second continuous tracks are manufactured of a thin, sturdy and flexible material.

8. The rescue and exploration apparatus of claim 7, wherein the thin, sturdy and flexible material comprises rubber.

9. The rescue and exploration apparatus of claim 7, wherein the thin, sturdy and flexible material comprises silicone-reinforced rubber.

10. The rescue and exploration apparatus of claim 7, wherein the sturdy and flexible material further comprises a series of rigid transverse strips configured to improve traction of the apparatus as it travels over a surface.

11. The rescue and exploration apparatus of claim 10, wherein the rigid strips are manufactured of a metal material.

12. The rescue and exploration apparatus of claim 11, wherein the metal material comprises aluminum, steel, iron, nickel copper, an alloy, or any combination thereof.

13. The rescue and exploration apparatus of claim 1, wherein the first and second frames are manufactured of a metal material.

14. The rescue and exploration apparatus of claim 13, wherein the metal material comprises aluminum, steel, iron, nickel, copper, an alloy, or any combination thereof.

15. The rescue and exploration apparatus of claim 13, wherein the metal material comprises about ¾ inch O.D. steel conduit.

16. The rescue and exploration apparatus of claim 13, wherein four sides form each of the first and second frames, the sides being connected to each other by a fastening means.

17. The rescue and exploration apparatus of claim 16, wherein the fastening means comprises screws, rivets, bolts, adhesive, welding, or any combination thereof.

18. The rescue and exploration apparatus of claim 1, wherein the first and second continuous tracks each comprise a contact surface having a length of at least about twenty inches and a width of at least about eight inches.

19. The rescue and exploration apparatus of claim 1, further comprising a plurality of motor minds electronically connected to a microcontroller one of the motor minds being operatively connected to each of the first drive motor and the steering means, and the microcontroller being operatively connected to the remote control.

20. The rescue and exploration apparatus of claim 19, wherein the microcontroller comprises a Basic Stamp® II microcontroller.

21. The rescue and exploration apparatus of claim 1, further comprising a camera secured to one of the first and second frames.

22. The rescue and exploration apparatus of claim 21, wherein the camera comprises a video camera.

23. The rescue and exploration apparatus of claim 1, further comprising at least one encoder electronically connected to at least the first drive motor.

24. The rescue and exploration apparatus of claim 23, wherein each encoder comprises a light source, a polycarbonate lens, a code wheel, and at least one photo diode, the light source being configured for emitting light through the lens and through slits in the code wheel onto the photo diode, the photo diode being electronically connected to the remote control.

25. The rescue and exploration apparatus of claim 1, wherein the remote control comprises a joystick and at least one toggle switch operatively connected to the first drive motor and the steering means.

26. The rescue and exploration apparatus of claim 21, further comprising a television receiver to allow the user to view the images received by the camera; the television receiver being operatively connected to the camera and electrically connected to the power source.

27. The rescue and exploration apparatus of claim 5, wherein the first drive motor driveably connects to the first drive sprocket and the second drive motor driveably connects to the second drive sprocket.

28. The rescue and exploration apparatus of claim 27, wherein the first and second drive sprockets further comprise plate covers secured thereto.

29. The rescue and exploration apparatus of claim 28, wherein the plate covers are manufactured of a metal.

30. The rescue and exploration apparatus of claim 28, wherein the plate covers have a rubber edging attached around the circumference of the plate covers.

31. The rescue and exploration apparatus of claim 27, wherein each of the first and second drive motors comprises a pulley or drive shaft, the first and second drive sprockets each comprising a corresponding pulley or drive shaft, each pulley or drive shaft being operatively connected to one of the corresponding pulleys or drive shafts.

32. The rescue and exploration apparatus of claim 31, wherein each pulley is connected to the corresponding pulley by a belt that comprises about a ⅕ pitch belt.

33. The rescue and exploration apparatus of claim 4, wherein the first and second drive motors can be selectively actuated for maneuvering the first and second frame members.

34. The rescue and exploration apparatus of claim 1, further comprising at least one flotation element secured to the first and second frames.

35. The rescue and exploration apparatus of claim 1, further comprising a life preserver removably secured to the apparatus.

36. The rescue and exploration apparatus of claim 1, wherein the remote control comprises a joystick and a plurality of switches, the joystick and the plurality of switches being operatively connected to a microcontroller programmed to control the speed and direction of at least the first drive motor and the steering means.

37. The rescue and exploration apparatus of claim 36, wherein the remote control further comprises a mechanical override switch to allow the rescue and exploration apparatus to be operated without speed control.

38. The rescue and exploration apparatus of claim 1, wherein the power source comprises a 12-volt battery, electricity, a portable generator; solar cells, combustion engines, fuel cells, steam generators, or any combination thereof.

39. The rescue and exploration apparatus of claim 38, wherein the power source is removably secured to at least one of the first or second frames.

40. The rescue and exploration apparatus of claim 38, wherein the power source is remotely located in proximity to the remote control and provides power to the rescue and exploration apparatus through a tether.

41. The rescue and exploration apparatus of claim 1, wherein the remote control is operatively connected to at least the first drive motor and the steering means by a tether, the tether having an internal cavity for communicating a plurality of electronic connections therebetween.

42. The rescue and exploration apparatus of claim 41, wherein the electronic connections comprise wire, cable, or fiber-optic cable.

43. The rescue and exploration apparatus of claim 1, wherein the remote control is operatively connected to at least the first drive motor and the steering means by a first transmitter/receiver electronically connected to the remote control and a second transmitter/receiver electronically connected to at least the first drive motor and the steering means, the first and second transmitter/receivers being configured to communicate with each other wirelessly.

44. The rescue and exploration apparatus of claim 43, wherein the first and second transmitter/receivers communicate with each other by radio or infrared waves.

* * * * *